(12) United States Patent
Woodson et al.

(10) Patent No.: US 6,433,101 B1
(45) Date of Patent: Aug. 13, 2002

(54) FLUORINATED POLYMERS AND METHODS FOR THEIR PREPARATION

(75) Inventors: Charles S. Woodson, Conroe, TX (US); Marc A. Hillmyer, Minneapolis, MN (US); Robert H. Grubbs, South Pasadena, CA (US); Timothy P. Lodge; Yu Ren, both of Minneapolis, MN (US)

(73) Assignees: Regents of the University of Minnesota, Minneapolis, MN (US); Cymetech, LLC, Huntsville, TX (US)

( * ) Notice: Subject to any disclaimer, the term of this patent is extended or adjusted under 35 U.S.C. 154(b) by 0 days.

(21) Appl. No.: 09/453,020

(22) Filed: Dec. 2, 1999

Related U.S. Application Data

(60) Provisional application No. 60/110,698, filed on Dec. 3, 1998.

(51) Int. Cl.$^7$ ................................................. C08F 8/18
(52) U.S. Cl. ............................... 525/332.1; 525/332.3; 525/359.1; 525/359.5
(58) Field of Search ........................... 525/332.1, 332.3

(56) References Cited

U.S. PATENT DOCUMENTS 3,933,768 A * 1/1976 Yukuta et al. ............ 525/331.7
5,069,943 A 12/1991 Hara et al. ................... 427/400

OTHER PUBLICATIONS

Yu, et al. "A New Class of Fluorinated Polymers by a Mild, Selective, and Quantitative Fluorination." Journal of the American Chemical Society, vol. 120, No. 27, pp. 6830–6831.

* cited by examiner

Primary Examiner—Bernard Lipman
(74) Attorney, Agent, or Firm—Pillsbury Winthrop LLP

(57) ABSTRACT

The present invention relates to the post-polymerization fluorination methods of polymers produced via ring-opening metathesis polymerization. Unlike prior art methods that result in low product yields and generally involve chemically aggressive reagents, the inventive methods produce fluorinated polymers in quantitative yields and under mild conditions. In preferred embodiments, a source of difluorocarbene is reacted with the desired polydiene to form a fluorinated polymer product. In preferred embodiments, the source of difluorocarbene is hexafluoropropylene oxide and the polydiene is poly-dicyclopentadiene ("poly-DCPD"). Fluorination and the concomitant removal of unsaturated bonds result in polymers having improved physical properties such as improved strength characteristics, enhanced oxidative and chemical stability, and low surface energies.

33 Claims, 1 Drawing Sheet

FLUORINATED POLYMERS AND METHODS FOR THEIR PREPARATION

This application claims priority from provisional application Ser. No. 60/110,698, filed Dec. 3, 1998.

BACKGROUND

The incorporation of fluorine into synthetic and biologically relevant macromolecules leads to materials with unique properties such as low surface energies, low dielectric constants, and resistance to harsh chemical environments. Because of these characteristics, fluorinated materials are used in contexts where chemical resistance or other special surface characteristics is desired (e.g. chemical resistant coatings, non-stick coatings, non-corrosive materials, anti-fouling coatings, and interlayer dielectrics).

As polymers have become increasingly important in the commercial context, methods for incorporating fluorine into polymeric materials have been investigated. These efforts can be categorized into either post-polymerization processing or the direct polymerization of fluorine-containing monomers. Post-polymerization fluorination routes are inherently limited to polymers that include accessible reaction sites. Moreover, available post-polymerization fluorination methods tend to be chemically aggressive (e.g. treatment with $F_2$, $SF_6$ under electrical discharge, $BF_3$—$Et_2O$, $SF_6$/HF, fluorinated peroxides, and HF electrochemically) and typically result in low product yield, loss of pendant functionality, degradation of the polymeric molecular weight, and unproductive cross-linking reactions. Because of these difficulties, most fluorinated polymers are prepared by the polymerization of fluorine-containing monomers. Unfortunately, this route can be exorbitantly expensive and thus not generally viable for most commercial contexts.

Therefore, a need exists for a simple, low cost method of preparing fluorinated polymers and polymeric products.

SUMMARY

The present invention relates to fluorinated polymeric products and methods of making the same. More particularly, the present invention relates to fluorinated poly-dicyclopentadiene ("poly-DCPD") and methods for making the same. In general, the inventive polymers are produced by the reaction of a source of difluorocarbene (:$CF_2$) and a polymer product formed by the ring opening metathesis polymerization ("ROMP") of a cyclic olefin. The fluorination reaction of the ROMP polymer product may optionally include a radical inhibitor. The difluorocarbene quantitatively adds to the population of double bonds that are inherently found in ROMP-derived polymers. As a result, post-polymerization fluorination provides synergistic benefits to the physical characteristics of ROMP polymers by removing reactive surface sites while at the same time incorporating fluorine atoms therein.

DETAILED DESCRIPTION OF THE PREFERRED EMBODIMENTS

Figure 1:
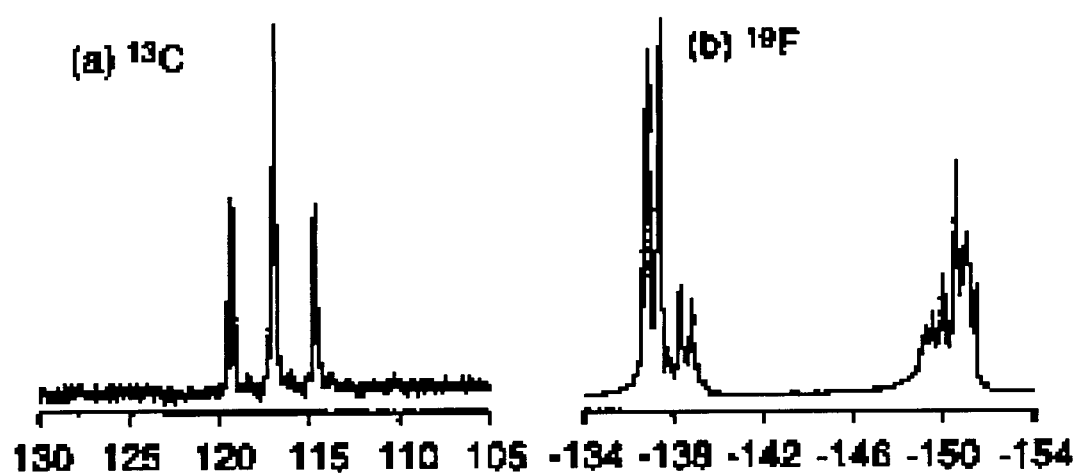
FIG. 1 shows representative $^{13}C$ and $^{19}F$ NMR spectra for a sample of FPI.

The present invention relates to fluorinated ROMP polymer products and methods for making the same. The polymer substrate for the practice of the present invention is formed via the ring opening metathesis polymerization of a cyclic olefin (or a combination of cyclic olefins). The cyclic olefins may be strained or unstrained, monocyclic or polycyclic, may optionally include hetero atoms, and may include one or more functional groups. Suitable cyclic olefins include but are not limited to norbornene, norbornadiene, dicyclopentadiene, cyclopentene, cycloheptene, cyclooctene, cyclooctadiene, cyclododecene, 7-oxanorbornene, 7-oxanorbornadiene, and derivatives therefrom. Illustrative examples of suitable functional groups include but are not limited to hydroxyl, thiol, ketone, aldehyde, ester, ether, amine, imine, amide, nitro, carboxylic acid, disulfide, carbonate, isocyanate, carbodiimide, carboalkoxy, and halogen. Preferred cyclic olefins include norbornene and dicyclopentadiene and their respective homologs and derivatives. The polymer product from the ROMP of dicyclopentadiene ("DCPD") or poly-DCDP is particularly preferred.

Suitable metathesis catalysts for ROMP reactions include ruthenium and osmium carbene catalysts as disclosed by U.S. Pat. Nos. 5,342,909; 5,312,940; 5,728,917; 5,750,815; 5,710,298, 5,831,108, and 5,728,785, all of which are incorporated herein by reference. Briefly, the ruthenium and osmium carbene catalysts possess metal centers that are formally in the +2 oxidation state, have an electron count of 16, are penta-coordinated, and are of the general formula

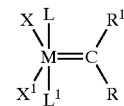

wherein:
M is ruthenium or osmium;
X and $X^1$ are each independently any anionic ligand;
L and $L^1$ are each independently any neutral electron donor ligand;
R and $R^1$ are each independently hydrogen or a substituent selected from the group consisting of $C_1$—$C_{20}$ alkyl, $C_2$—$C_{20}$ alkenyl, $C_2$—$C_{20}$ alkynyl, aryl, $C_1$—$C_{20}$ carboxylate, $C_1$—$C_{20}$ alkoxy, $C_2$—$C_{20}$ alkenyloxy, $C_2$—$C_{20}$ alkynyloxy, aryloxy, $C_2$—$C_{20}$ alkoxycarbonyl, $C_1$—$C_{20}$ alkylthio, $C_1$—$C_{20}$ alkylsulfonyl and $C_1$—$C_{20}$ alkylsulfinyl. Optionally, each of the R or $R^1$ substituent group may be substituted with one or more moieties selected from the group consisting of $C_1$—$C_{10}$ alkyl, $C_1$—$C_{10}$ alkoxy, and aryl which in turn may each be further substituted with one or more groups selected from a halogen, a $C_1$—$C_5$ alkyl, $C_1$—$C_5$ alkoxy, and phenyl. Moreover, any of the catalyst ligands may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In preferred embodiments of these catalysts, the R substituent is hydrogen and the $R^1$ substituent is selected from the group consisting $C_1$—$C_{20}$ alkyl, $C_2$—$C_{20}$ alkenyl, and aryl. In even more preferred embodiments, the $R^1$ substituent is phenyl or vinyl, optionally substituted with one or more moieties selected from the group consisting of $C_1$—$C_5$ alkyl, $C_1$—$C_5$ alkoxy, phenyl, and a functional group. In especially preferred embodiments, $R^1$ is phenyl or vinyl substituted with one or more moieties selected from the group consisting of chloride, bromide, iodide, fluoride, —$NO_2$, —$NMe_2$, methyl, methoxy and phenyl. In the most preferred embodiments, the $R^1$ substituent is phenyl.

In preferred embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether. In more preferred embodiments, L and $L^1$ are each a phosphine of the formula $PR^3R^4R^5$, where $R^3$, $R^4$, and $R^5$ are each independently aryl or $C_1$—$C_{10}$ alkyl, particularly primary alkyl, secondary alkyl or cycloalkyl. In the most preferred embodiments, L and $L^1$ ligands are each selected from the group consisting of —P(cyclohexyl)$_3$, —P(cyclopentyl)$_3$, —P(isopropyl)$_3$, and —P(phenyl)$_3$.

In preferred embodiments of these catalysts, X and $X^1$ are each independently hydrogen, halide, or one of the following groups: $C_1$—$C_{20}$ alkyl, aryl, $C_1$—$C_{20}$ alkoxide, aryloxide, $C_3$—$C_{20}$ alkyldiketonate, aryldiketonate, $C_1$—$C_{20}$ carboxylate, arylsulfonate, $C_1$—$C_{20}$ alkylsulfonate, $C_1$—$C_{20}$ alkylthio, $C_1$—$C_{20}$ alkylsulfonyl, or $C_1$—$C_{20}$ alkylsulfinyl. Optionally, X and $X^1$ may be substituted with one or more moieties selected from the group consisting of $C_1$—$C_{10}$ alkyl, $C_1$—$C_{10}$ alkoxy, and aryl which in turn may each be further substituted with one or more groups selected from halogen, $C_1$—$C_5$ alkyl, $C_1$—$C_5$ alkoxy, and phenyl. In more preferred embodiments, X and $X^1$ are halide, benzoate, $C_1$—$C_5$ carboxylate, $C_1$—$C_5$ alkyl, phenoxy, $C_1$—$C_5$ alkoxy, $C_1$—$C_5$ alkylthio, aryl, and $C_1$—$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride.

The ROMP reaction may occur either in the presence or absence of solvent and may optionally include formulation auxiliaries. Known auxiliaries include antistatics, antioxidants, light stabilizers, plasticizers, dyes, pigments, fillers, reinforcing fibers, lubricants, adhesion promoters, viscosity-increasing agents and demolding enhancers. Illustrative examples of fillers for improving the optical physical, mechanical and electrical properties include glass and quartz in the form of powders, beads and fibers, metal and semi-metal oxides, carbonates (i.e. $MgCO_3$, $CaCO_3$), dolomite, metal sulfates (such as gypsum and barite), natural and synthetic silicates (i.e. zeolites, wollastonite, feldspars), carbon fibers, and plastics fibers or powders.

Post-polymerization fluorination of ROMP-derived polymers enhance the characteristics of the resulting product in two ways. First, the chemical (particularly oxidative) stability of the polymer product is significantly enhanced due to the removal of surface accessible polymeric double bonds. Moreover, the addition of fluorine imparts unique characteristics to the polymer apart from the mere removal of the olefinic bonds. Without being bound by theory, the incorporation of fluorine atoms is believed to result into enhanced impact strength characteristics for the fluorinated polymer product. In addition, the presence of the fluorine atoms leads to low surface energies, low dielectric constants, high incompatibility with other polymers, solubility in supercritical $CO_2$, and resistance to harsh chemical environments. As a result, fluorinated polymers are ideal for making chemical resistant coatings, noncorrosive materials, antifouling coatings, and interlayer dielectrics.

In general, the post-polymerization fluorination involves reacting difluorocarbene source with a ROMP-derived polymer to form the desired fluorinated polymer product. The difluorocarbene source may be difluorocarbene itself or a difluorocarbene precursor. An especially preferred example of a difluorocarbene precursor is hexafluoropropylene oxide ("HFPO") and homologs thereof. For example, Scheme 1 illustrates the generation of difluorocarbene upon thermolysis of HFPO:

Scheme 1

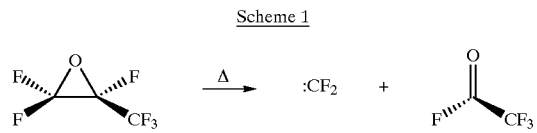

Other methods for generating diflourocarbene include those outlined by Scheme 2.

Scheme 2

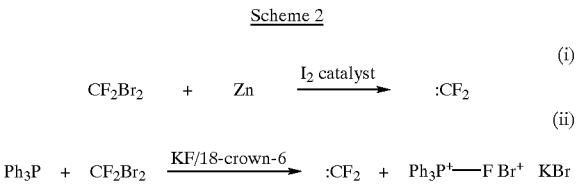

As shown by Scheme 3, the generated difluorocarbene then reacts with the ROMP-derived polydiene to form the desired fluorinated polymer.

Scheme 3

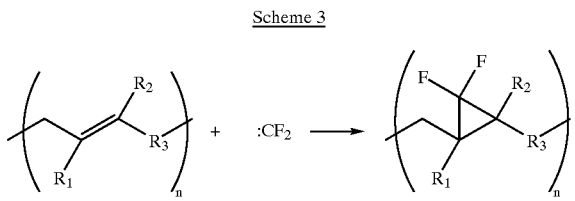

wherein $R_1$ and $R_2$ are each independently hydrogen or a substituent group selected from the group consisting of $C_1$—$C_{20}$ alkyls, cyclic alkyls, bicyclic alkyls, cyclic alkenyls, bicyclic alkenyls, aryls, esters, and ethers. Optionally, each of the $R_1$ or $R_2$ substituent group may be substituted with one or more moieties selected from the group consisting of $C_1$—$C_{10}$ alkyls, cyclic alkyls, bicyclic alkyls, cyclic alkenyls, bicyclic alkenyls, aryls, esters and ethers. Moreover, $R_1$ and $R_2$ can be cis or trans in relation to each other. $R_3$ is selected from the group consisting of $C_1$—$C_{20}$ alkyls, cyclic alkyls, bicyclic alkyls, cyclic alkenyls, bicyclic alkenyls, aryls, esters, and ethers and may be substituted or unsubstituted. Optionally, $R_3$ may be substituted with one or more moieties selected form the group consisting of $C_1$—$C_{10}$ alkyls, cyclic alkyls, bicyclic alkyls, cyclic alkenyls, bicyclic alkenyls, aryls, esters and ethers. In the above formula, n is greater than 1, preferably greater than 10. A radical inhibitor may be optionally included to minimize free radical side reactions. Illustrative examples of suitable radical inhibitors include but are not limited to Irganox, Ethanox (4,4 methylene bis (2,6-di-tertbutyl phenol)), hydroquinones, and nitro-containing compounds. An especially preferred radical inhibitor is 2,6-di-tert-butyl-4-methylphenol ("BHT").

For the purposes of clarity, a detailed description of the inventive procedure will be disclosed with respect to model polydienes selected for having well defined molecular weight, backbone regiochemistry, and molecular weight distribution. However, it is to be understood that the following discussions are intended to illustrate and not to limit the scope of the present invention.

Tables 1 and 1a are a summary of the fluorination experiments on the model polymers: polyisoprene ("PI"); polydimethylbutadiene ("PDB"); and polybutadiene ("PB"), showing the reaction of HFPO with model polydienes. All of the polydienes have high 1,4 (—$CH_2$—CR=CH—$CH_2$—) microstructure but do contain a small fraction of 1,2 (—$CH_2$—CH(CR=$CH_2$)—) regioadditions (4,1 and 4,3 in the case of PI). All GPC analysis was performed in $CHCl_3$ and M and PDI were calculated by using PS standards (the GPC solvent for entry 11 was THF). Also shown is the concentration of polydiene double bonds in cyclohexane solution. The tables used data obtained from $^1H$ NMR spectroscopy.

TABLE 1

| entry | precursor polymer | precursor $M_n$ (kg/mol) | precursor PDI | [C=C] (M)[6] | [HFPO]/ [C=C] | BHT (wt %) |
|---|---|---|---|---|---|---|
| 1 | PI | 63 | 1.12 | 0.69 | 3.5 | 0 |
| 2 | PI | 63 | 1.12 | 0.71 | 2.9 | 5 |
| 3 | PI | 13 | 1.04 | 0.18 | 6.9 | 7 |
| 4 | PI | 13 | 1.04 | 0.14 | 6.1 | 12 |
| 5 | PI | 13 | 1.04 | 0.36 | 1.6 | 4 |
| 6 | PI | 13 | 1.04 | 0.37 | 1.1 | 4 |
| 7 | PI | 13 | 1.04 | 1.26 | 2.5 | 1 |
| 8 | PI | 13 | 1.04 | 0.18 | 5.8 | 0 |
| 9 | PDB | 24 | 1.06 | 0.24 | 5.7 | 3.5 |
| 10 | PB | 59 | 1.10 | 0.21 | 6.1 | 10 |
| 11 | PI-b-PS | 73 | 1.06 | 0.09 | 10.0 | 7 |

TABLE 1a

| entry | T (° C.) | time (h) | isolated yield (%) | C=C conv (%) | product $M_n$ (kg/mol) | product PDI |
|---|---|---|---|---|---|---|
| 1 | 185 | 18 | 74 | >99 | 84 | 1.91 |
| 2 | 185 | 19 | 76 | >99 | 70 | 1.16 |
| 3 | 170 | 67 |  | >99 | 14 | 1.08 |
| 4 | 185 | 8 | 82 | >99 | 17 | 1.03 |
| 5 | 185 | 16 | 71 | >99 | 15 | 1.06 |
| 6 | 185 | 10 |  | 64 | 15 | 1.05 |
| 7 | 185 | 21 | 87 | >99 | 17 | 1.03 |
| 8 | 185 | 18 |  | >99 | 17 | 1.05 |
| 9 | 185 | 16 | 78 | >99 | 21 | 1.16 |
| 10 | 185 | 17 | 72 | >99 |  |  |
| 11 | 170 | 47 | 87 | >99 | 79 | 1.10 |

In a preliminary experiment (entry 1, Table 1), a solution of cyclohexane containing 4.7 wt. % of polyisoprene ($\overline{M}_n \approx 63$ kg/mol, PDI≈1.12) and 3.5 equivalents (relative to the backbone double bonds) of HFPO (bp=−42° C.) was heated in a stainless steel high-pressure reactor to 185° C. for 18 hours. The reactor was cooled and vented, and after isolation of the polymer it was determined by $^1H$ NMR spectroscopy that all of the backbone olefinic resonances were absent. Examination of the $^{19}F$ and $^{13}C$ NMR spectra corroborated the structure shown by Scheme 2 ($R_1$=H, $R_2$=Me). However, analysis of the fluorinated polyisoprene (FPI) by GPC showed a bimodal molecular weight distribution with $\overline{M}_n \approx 84$ kg/mol and PDI≈1.91. Because polyisoprene is particularly susceptible to cross-linking and chain degradation in the presence of free radicals, it is believed that the observed increase in the PDI for entry 1 is due to the high reaction temperature.

While HFPO is a convenient: $CF_2$ source, the reaction conditions necessary for: $CF_2$ generation can lead to product rearrangements. To minimize these side reactions, most of the subsequent fluorinations occurred in the presence of a radical inhibitor, 2,6-di-tert-butyl-4-methylphenol(BHT).

As shown by the subsequent entries in Tables 1 and 1a, the addition of BHT resulted in a remarkable finding that the polydienes were quantitatively fluorinated while preserving the molecular parameters of the respective parent material. Comparison of entries 1 and 2 in Table 1 shows that the addition of 5 wt. % BHT preserves the PDI of the product without sacrificing the degree of double bond saturation. Moreover, the inventive fluorination method is surprisingly robust. The fluorination can be performed at temperatures as low as 165° C. and as high as 185° C., with a small excess of HFPO, and with low levels of BHT. The reaction of the HFPO with model polydienes can occur within a couple hours to a few days. The preferred solvent for the reaction is cyclohexane. In addition, unlike the higher molecular weight cases, low molecular weight polyisoprene can be successfully fluorinated in the absence of BHT.

The conversions in Tables 1 and 1a were determined by integration of the $^1H$ NMR spectra of the fluorinated products. The isolated yields were measured after a minimum of two precipitations of the product from tetrahydrofuran ("THF") in methanol/2-propanol. The GPC of the crude product from entry 7 was identical to the GPC of the precipitated product.

FIG. 1 shows representative $^{13}C$ and $^{19}F$ NMR spectra for a sample of FPI. As can be seen in FIG. 1, the doubles of doublets at 117.0 ppm in the ($J_{CF}$=289 and 297 Hz) in the $^{13}C$ NMR spectrum is from the gem-difluoro-substituted carbon coupled to the two different fluorine atoms. The chemical shift and coupling constants are close to values reported for a similar trisubstituted difluorocyclopropane small molecule (116.6 ppm; $J_{CF}$=280 and 306 Hz). The $^{19}F$ NMR spectrum of this FPI was very similar to the spectrum of difluorotrimethylcyclopropane, which is an FPI repeat unit analogue. However, the $^{19}F$ NMR spectrum of FPI is complicated by the presence of cis and trans backbone isomers and a small fraction of 4,3-regioisomer in the precursor. The structure of the fluorinated polymers were further confirmed by IR spectroscopy and elemental analysis.

Fluorinated polydienes were prepared from polyisoprene, polydimethylbutadiene (PDB, $R_1$=$R_2$=$CH_3$), and polybutadiene (PB, $R_1$=$R_2$=H). From $^1H$, $^{13}C$, and $^{19}F$ NMR spectra of the products, it is evident that all of the olefinic sites have been selectively converted to the difluorocyclopropane species. No other: $CF_2$ insertion products were observed. Since both cis/trans 1,4 regioisomers and small amounts (≈5%) of 1,2 regioisomer are present in each of the starting polydienes, the quantitative addition of: $CF_2$ to this set of polymers showed that fluorination of alkyl-substituted alkenes with every substitution pattern (mono; 1,1:, 1,2(c/t), 1,1,2 (E/Z); and tetrasubstituted) proceeded smoothly under these reaction conditions. In a partially fluorinated PI (entry 6/Table 1), the $^1H$ NMR spectrum showed no change in the ration of 4,3 to 4,1, regiochemistry, suggesting the trisubstituted and 1,1-disubstituted double bonds have similar reactivities under these conditions.

Preliminary physical characterization of the fluorinated polydienes was done by DSC and TGA. These results are presented in Table 2.

TABLE 2

| Sample | Tg (° C.) | $T_d$ (° C.)# | Θ ($H_2O$) | $Θ_r(H_2O)$[h] |
|---|---|---|---|---|
| PB | −101° | 404 | 91 ± 2 | 45 ± 2 |
| FPB (entry 10) | −1° | 355 | 91 ± 1 | 85 ± 6 |
| PI | −61° | 344 | 98 ± 6 | 35 ± 7 |
| FPI (entry 2) | 43° | 309 | 91 ± 1 | 81 ± 6 |
| PDB | −5° | 330 | 77 ± 1 | 75 ± 2 |
| FPDB (entry 9) | 89° | 328 | 89 ± 1 | 81 ± 4 |

Table 2 shows the temperature at 5% weight loss and advanced and receding water contact angle. These polymers showed melting endotherms (≈150° C.) in the DSC. The glass transition temperatures ($T_g$) of the fluorinated polymers increased by approximately 100° C. in all cases. This is presumably due to the dipole moment imparted by the $CF_2$ moiety in the polymer backbone leading to interchain dipole-dipole interactions. The thermal stability of the three-membered ring in the backbone of the polymer was investigated since the extrusion of: $CF_2$ from gem-difluorocycloproprane has been observed in many systems. From thermal gravimetric analysis ($N_2$ atmosphere, 10° C./min), all of the polymers retained 95% of their original weight up above 300° C. In addition, a sample of FPI (entry 5, Table 1) held at 200° C. under $N_2$ for 1 hour, retained 99.7% of its original weight, showed no significant change in molecular weight or PDI, had an identical $^1H$ NMR spectrum, and retained its solubility characteristics.

All of the fluorinated polydienes studied were insoluble in cyclohexane at room temperature (FPI was soluble in cyclohexane at ≈60° C.). Both FPI and FPDB were soluble in common organic solvents such as THF, chloroform, toluene, and methylene chloride at room temperatures. FPB was not soluble in these solvents but only soluble in THF and trifluoromethylbenzene at elevated temperature. The solubility of these fluorinated polymers in polar solvents is further evidence for a polar repeat unit. Thin films prepared by spin casting were annealed (150° C., vacuum, overnight) for contact angle measurements with deionized water (Table 2). Fluorination generally leads to a moderate increase in both the advancing and receding contact angle. However, the resulting film from these studies displayed large hysteresis presumably due to surface roughness.

The present invention may also be practice with block copolymers. As shown by entry 11 of Table 1, the inventive method results in selective fluorination of the polyisoprene in a model polyisoprene-polystyrene block copolymer. As with homopolymers, preservation of the molecular weight and PDI in the parent block copolymer was observed.

The inventive methods are readily adapted to ROMP-derived polymers. The following illustrates these methods as they apply to dicyclopentadiene.

Post-polymerization fluorination of poly-DCPD

Two 10×10 mm squares of poly-DCPD with a thickness of about 2mm (0.84 g total) were placed in a stainless steel high pressure reactor. 42 mg of BHT and 50 ml of cyclohexane were added, and the reactor was sealed. 2.6 g (2.5 eq/total olefinic sites) of HFPO was condensed into the reactor. The reactor was heated to 185° C. for 16 hours, cooled to room temperature, vented and disassembled. The intact squares were removed from the reactor and rinsed with isopropanol. The polymer was dried in vacuum oven at 100° C. overnight before further characterization.

Characterization of fluorinated poly-DCPD

A poly-DCPD specimen was fluorinated using the method of preparation described above. Following the fluorination reaction, the specimen was orange to brown in color and slightly swollen with reaction solvent but retained mechanical integrity. X-ray photoelectron spectroscopy (XPS) analysis results of the poly-DCPD specimen prior to fluorination indicated the absence of any fluorine and were as follows:

| | |
|---|---|
| Carbon | 61.8% |
| Oxygen | 21.6% |
| Silicon | 16.6% |
| Fluorine | Not detected |

The presence of oxygen and silicon are believed to be due to contamination of the specimen with silicon grease and not believe to be components of poly-DCPD.

Analysis of the poly-DCPD specimen after the fluorination method in accordance with the present invention indicated substantial incorporation of fluorine in the specimen (at least at the surface). The XPS analytical results of the surface of the fluorinated specimen (i.e. approximately the first 70 angstroms) were as follows:

| | |
|---|---|
| Carbon | 68.5% |
| Oxygen | 16.1% |
| Silicon | 8.8% |
| Fluorine | 6.6% |

The presence of oxygen and silicon are, again, believed to be due to contamination of the specimen with silicon grease.

Elemental analysis of a portion of the fluorinated specimen yielded the following mass percent results:

| | |
|---|---|
| Carbon | 88.4% |
| Hydrogen | 9.9% |
| Fluorine | 0.9% |

The following publication and citations therein are incorporated herein by reference: Ren, Y., Lodge, T. P., and Hillmyer, M. A., "A New Class of Fluorinated Polymers by a Mild, Selective, and Quantitative Fluorination", *J Am. Chem. Soc.*, 120, 6830–6831 (1998).

What is claimed is:

1. A compound of the formula:

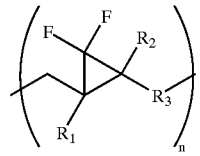

wherein $R_1$ and $R_2$ are independently selected from the group consisting of hydrogen and a substituent group selected from the group consisting of $C_1$—$C_{20}$ alkyls, cyclic alkyls, bicyclic alkyls, cyclic alkenyls, bicyclic alkenyls, aryls, esters, and ethers, herein each of the substituents is substituted or unsubstituted, and wherein $R_1$ and $R_2$ can be cis or trans in relation to each other; wherein $R_3$ is selected from the group consisting of $C_1$—$C_{20}$ alkyls, cyclic alkyls, bicyclic alkyls, cyclic alkenyls, bicyclic alkenyls, aryls, esters, and ethers, and wherein $R_3$ is substituted or unsubstituted; and wherein n is greater than 1.

2. A compound according to claim 1 wherein the substituent group is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

3. A compound according to claim 1 wherein $R_1$ is hydrogen and $R_2$ is selected from the group consisting of $C_1$—$C_{20}$ alkyls, cyclic alkyls, bicyclic alkyls, cyclic alkenyls, bicyclic alkenyls, aryls, esters, and ethers.

4. A compound according to claim 1 wherein $R_3$ is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

5. A compound according to claim 1 wherein $R_3$ is dicyclopentadiene.

6. A compound according to claim 1 wherein n is greater than 10.

7. A product of the fluorination of a polymer substrate, the product having the general formula:

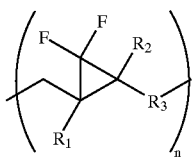

wherein $R_1$ and $R_2$ are independently selected from the group consisting of hydrogen and a substituent group selected from the group consisting of $C_1$—$C_{20}$ alkyls, cyclic alkyls, bicyclic alkyls, cyclic alkenyls, bicyclic alkenyls, aryls, esters, and ethers, wherein each of the substituents is substituted or unsubstituted and wherein $R_1$ and $R_2$ can be cis or trans in relation to each other; wherein $R_3$ is selected from the group consisting of $C_1$—$C_{20}$ alkyls, cyclic alkyls, bicyclic alkyls, cyclic alkenyls, bicyclic alkenyls, aryls, esters, and ethers, and wherein $R_3$ is substituted or unsubstituted; and
wherein n is greater than 1.

8. A product according to claim 7 wherein the substituent group is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

9. A product according to claim 7 wherein $R_1$ is hydrogen and $R_2$ is selected from the group consisting of $C_1$—$C_{20}$ alkyls, cyclic alkyls, bicyclic alkyls, cyclic alkenyls, bicyclic alkenyls, aryls, esters, and ethers.

10. A product according to claim 7 wherein $R_3$ is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

11. A product according to claim 7 wherein $R_3$ is dicyclopentadiene.

12. A product according to claim 7 wherein n is greater than 10.

13. A product according to claim 7 wherein the polymer substrate is selected from the group consisting of polyisoprene, polydimethylbutadiene, and polybutadiene.

14. A product according to claim 7 wherein the polymer substrate is a block copolymer.

15. A product according to claim 7 wherein the polymer substrate is a product of the ring opening metathesis polymerization of at least one cyclic olefin, wherein the cyclic olefin is strained or unstrained.

16. A product according to claim 7 wherein n is greater than 10.

17. A method for synthesizing a compound of the formula

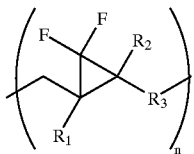

comprising the step of contacting a polymer substrate with a difluorocarbene source and wherein $R_1$ and $R_2$ are independently selected from the group consisting of hydrogen and a substituent group selected from the group consisting Of $C_1$—$C_{20}$ alkyls, cyclic alkyls, bicyclic alkyls, cyclic alkenyls, bicyclic alkenyls, aryls, esters, and ethers, wherein each of the substituents is substituted or unsubstituted, and wherein $R_1$ and $R_2$ can be cis or trans in relation to each other; wherein $R_3$ is selected from the group consisting of $C_1$—$C_{20}$ alkyls, cyclic alkyls, bicyclic alkyls, cyclic alkenyls, bicyclic alkenyls, aryls, esters, and ethers, wherein $R_3$ is substituted or unsubstituted;
and wherein n is greater than 1.

18. A method according to claim 17 wherein the substituent group is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

19. A method according to claim 17 wherein $R_1$ is hydrogen and $R_2$ is selected from the group consisting of $C_1$—$C_{20}$ alkyls, cyclic alkyls, bicyclic alkyls, cyclic alkenyls, bicyclic alkenyls, aryls, esters, and ethers.

20. A method according to claim 17 wherein $R_3$ is substituted with one or more moieties selected from the group consisting of $C_1$—$C_{10}$ alkyls, cyclic alkyls, bicyclic alkyls, cyclic alkenyls, bicyclic alkenyls, aryls, esters, and ethers.

21. A method according to claim 17 wherein $R_3$ is dicyclopentadiene.

22. A method according to claim 17 wherein n is greater than 10.

23. A method according to claim 17 wherein the polymer substrate is selected from the group consisting of polyisoprene, polydimethylbutadiene, and polybutadiene.

24. A method according to claim 17 wherein the polymer substrate is a block copolymer.

25. A method according to claim 17 wherein the polymer substrate is a product of the ring opening metathesis polymerization of at least one cyclic olefin, wherein the cyclic olefin is strained or unstrained.

26. A method according to claim 25 wherein the cyclic olefin is selected from the group consisting of norbornene, norbornadiene, dicyclopentadiene, poly-dicyclopentadiene, cyclopentene, cycloheptene, cyclooctene, cyclooctadiene, cyclododecene, 7-oxanorbornene, 7-oxanorbornadiene, and derivatives therefrom.

27. A method according to claim 25 wherein the cyclic olefin includes at least one functional group.

28. A method according to claim 27 wherein the functional group is selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen.

29. A method according to claim 17 wherein the difluorocarbene source is a difluorocarbene precursor.

30. A method according to claim 29 wherein the difluorocarbene precursor is hexafluoropropylene oxide and homologs thereof.

31. A method according to claim 17 further comprising the step of adding a radical inhibitor.

32. A method according to claim 31 wherein the radical inhibitor is selected from the group consisting of Irganox, Ethanox, hydroquinones, and nitro-containing compounds.

33. A method according to claim 31 wherein the radical inhibitor is 2,6-di-tert-butyl-4-methylphenol.

* * * * *